Figure 1:
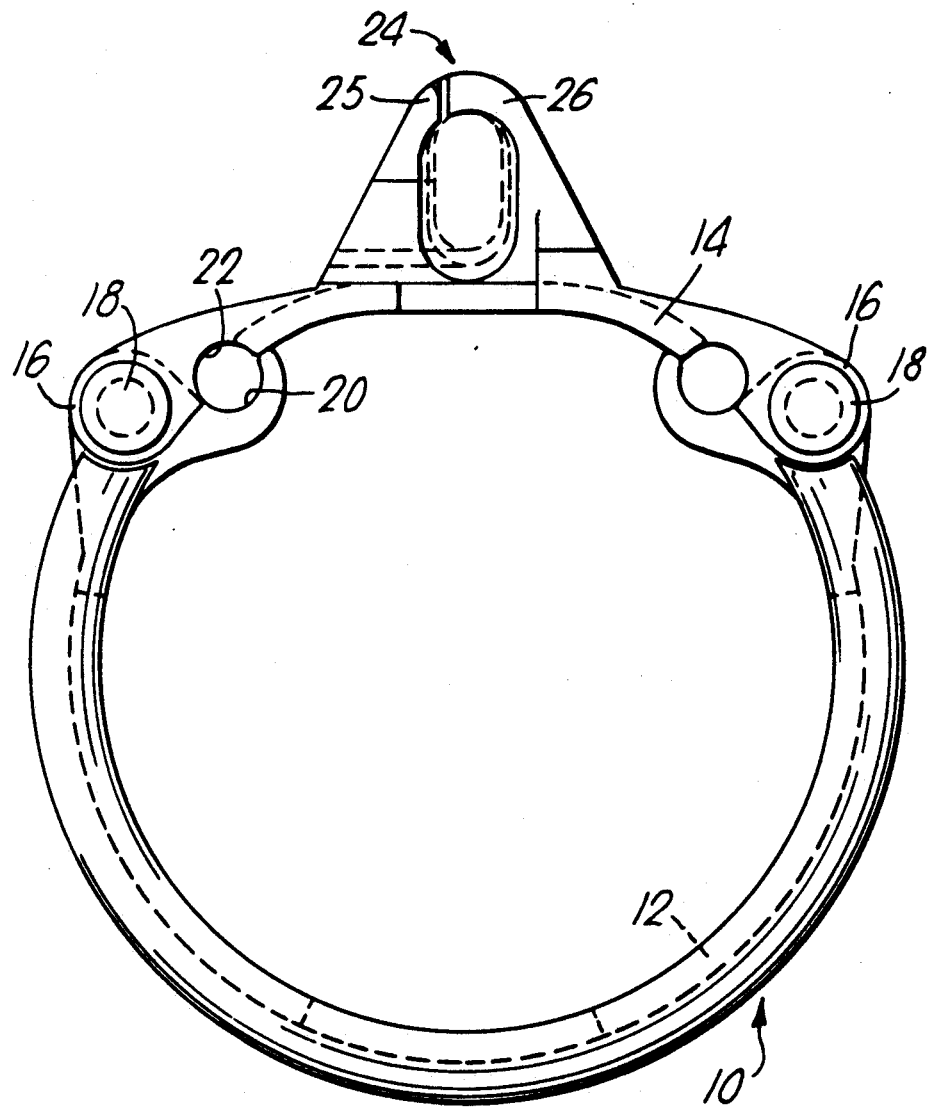

United States Patent [19]
Cole

[11] Patent Number: 5,236,178
[45] Date of Patent: Aug. 17, 1993

[54] CABLE GUIDE TUBE ASSEMBLY
[75] Inventor: Christopher Cole, Hants, England
[73] Assignee: British Telecommunications public limited company, London, England
[21] Appl. No.: 903,709
[22] Filed: May 27, 1992

Related U.S. Application Data
[63] Continuation at PCT/GB90/01480 Sep. 27, 1990.

[30] Foreign Application Priority Data
Sep. 27, 1989 [GB] United Kingdom ............... 8921747

[51] Int. Cl.⁵ .......................................... B65H 59/00
[52] U.S. Cl. ........................................ 254/134.35 C
[58] Field of Search ............... 294/82.1, 82.17, 132; 24/21, 24; 254/134.3 R, 134.3 FT, 134.3 SC, 134.3 PA

[56] References Cited

U.S. PATENT DOCUMENTS

| | | | |
|---|---|---|---|
| 1,040,975 | 10/1912 | Clark | 254/134.3 R |
| 1,073,658 | 9/1913 | Bolus | 254/134.3 R |
| 1,191,000 | 7/1916 | Harrison | 24/24 |
| 1,299,018 | 4/1919 | Pearson | 294/82.17 |
| 1,812,961 | 7/1931 | Kent | 254/134.3 R |
| 2,909,386 | 10/1959 | Ramey | 294/82.1 |
| 3,466,881 | 9/1969 | Cole . | |
| 4,134,574 | 1/1979 | Jean et al. | 254/134.3 R |
| 4,485,530 | 12/1984 | Begley et al. | 24/24 |

Primary Examiner—Robert C. Watson
Attorney, Agent, or Firm—Nixon & Vanderhye

[57] ABSTRACT

A cable guide of tube assembly for guiding undersea cables along a tow wire comprises a C-section part (12) and a closing part (14) which together make up the guide sleeve (10). A locking hook arrangement (24) is integrally formed with the closing part by which the assembly is attached to the wire. The component parts are interchangeable to allow different sizes of guide tube to be matched to different sizes of wire. By dismantling the assembly, it is also efficiently stored.

22 Claims, 2 Drawing Sheets

CABLE GUIDE TUBE ASSEMBLY

This is a continuation of PCT U.S. Patent application No. PCT/GB90/01480, filed Sep. 27, 1990.

This invention relates to a guide tube for attachment to a towing line. The invention is particularly applicable to a guide tube for an undersea cable which maybe attached to a towing wire which is used in the deployment of the undersea cable.

In the deployment of undersea cables, for example, transatlantic telephone cables, a plough is towed along the sea bed on the end of a towing line attached to a mother ship. The ship pulls the plough along to create a trench. The cable is payed out from the ship, passes through the body of the plough and is laid in the trench behind it. Paying out a length of cable, particularly at a considerable depth, gives rise to a variety of problems.

Firstly, the weight of the cable between the ship and the plough is very considerable. This may increase the tension on the cable at the plough. In laying the cable, the plough constrains it to follow a bent path as it passes through the plough to be laid in the trench behind. Thus, it is desirable to reduce, as far as possible, the tension in the cable entering the plough in order to minimize the residual tension in the cable when laid in trench.

Secondly, the loose cable is affected by currents in the water and will tend to wander from the path of the towing lines. As a result, the angle of entry of the cable is often to one side or the other of the plough, to the extent that the resistance to passage of the cable through the plough is increased still further.

To avoid this, a cable guide tube was developed which is attachable to the towing line. The guide tube defines a sleeve through which the cable is constrained to run when being deployed. The specific gravity of the tube is made as small as possible so that it does not add significantly to the overall weight of the tow wire and hence the tension in it, allowing it to support the cable, and any joints and repeaters on it as well as the line. Furthermore, by passing the cable through successive guiding sleeves it cannot wander from he path of the towing line. In general the cable tension at the plough has been reduced by a factor of ten using the guide tubes. A typical tension in a guide tube assisted cable is about 0.5 tonne or less at the plough.

The known guide tube comprises a sleeve portion having a longitudinal slit which allows the supported cable to be inserted. The sleeve is suspended from the towing wire by means of a metal clip which also closes the slit in the sleeve. The guide tubes are spaced along the wire by intermediate spacers attached between the guide tubes.

While the use of guide tubes has proved successful as a concept, the guide tubes have proved to be both awkward to handle, and insufficiently adaptable.

Another factor is that they represent a considerable investment when it is considered that guide tubes are spaced at one meter intervals along a towing line which is deploying a cable in 900 meters of water. It has also been found that the guide tubes are particularly cumbersome and do not lend themselves to efficient storage.

According to the present invention there is provided a guide tube assembly comprising a sleeve portion and a securing portion attached to the sleeve portion and adapted to secure the sleeve portion to a line, wherein the sleeve portion comprises a C-section part and a closing part which is detachably secured to C-section part towards the free ends thereof to complete the sleeve.

It is also found that some of the portions of the guide tube assembly tend to get damaged or wear out more frequently than others. Using the present invention, the components can be renewed without having to replace the entire assembly. This can represent a considerable cost saving.

Preferably, the closing part is formed integrally with the securing part.

Preferably, the assembly in symmetrical in lateral section about a line passing through the lateral center of the sleeve and the securing parts.

Preferably, the sleeve portion is formed with at least one auxiliary guide tube, extending in the same direction as the main guide tube.

Preferably, the auxiliary guide tube is formed in the wall of the main guide tube. The auxiliary guide tube may be formed by complementary formations in the C-section part and the engaged closing part.

Preferably, the C-section part and the closing part are secured together by means of at least one locating pin extending through aligned channels or holes within the engaged parts. There may be two pins arranged symmetrically on either side of the securing part.

Preferably, the securing part extends longitudinally beyond the sleeve part to constitute a spacer.

Different size securing means maybe required for different towing wire sizes. With this invention the detachable securing part can be replaced with one having the correct size securing arrangement for a given wire. Typical wire diameters are 36 mm, 45 mm, and 54 mm. Conversely, the same securing part can be used with different sleeve sizes to accommodate different cable sizes.

Figure 2:
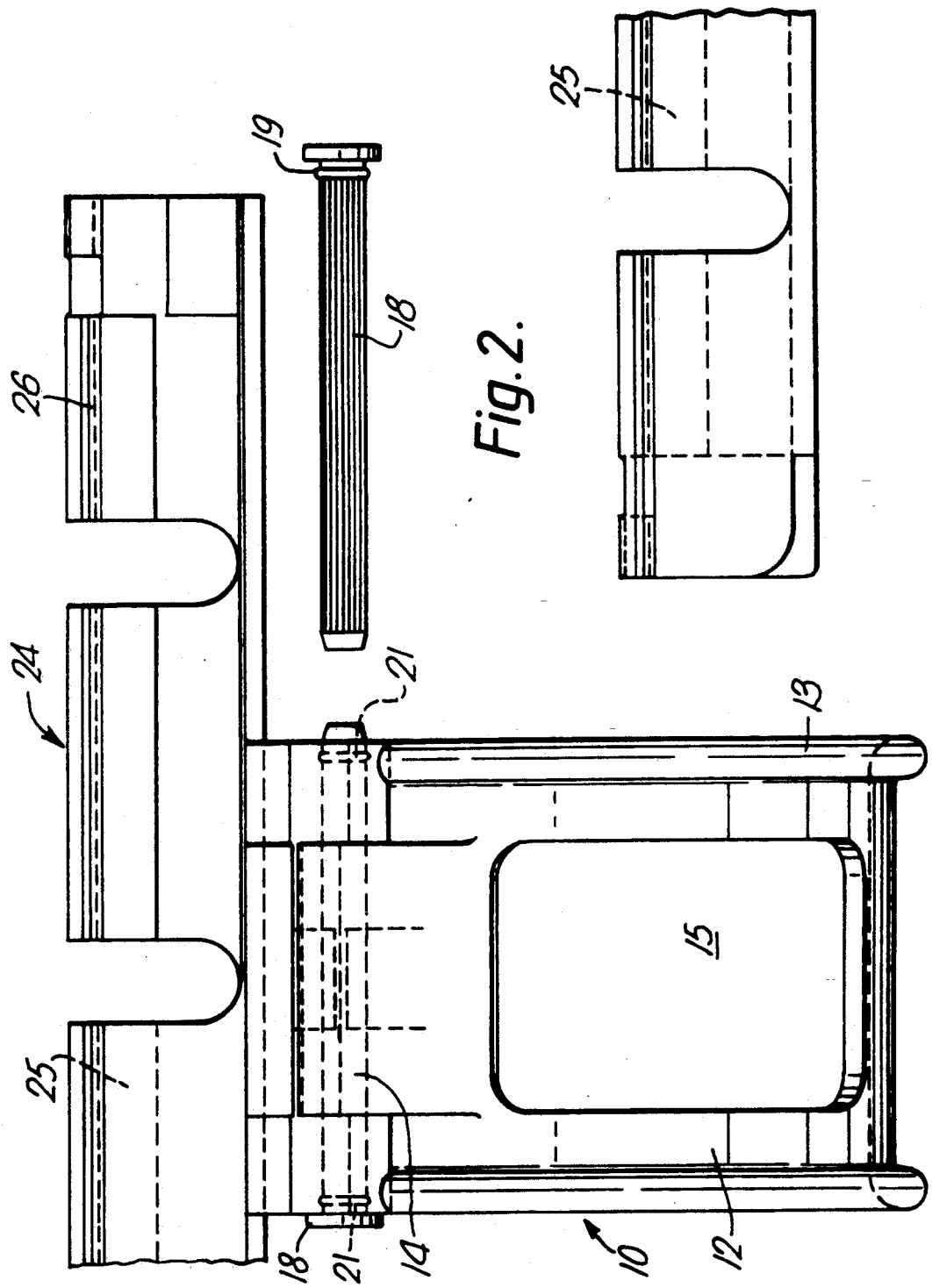

The present invention can be put into practice in various ways, one of which will now be described by way of example with reference to the accompanying drawings in which:

FIG. 1 is end view of a guide tube assembly according to the present invention: and FIG. 2 is a side view of the assembly of FIG. 1.

Referring to the drawings, a guide tube assembly comprises a 300 mm long 406 mm inner radius sleeve 10 comprising a rigid, 30.5 mm thick, polyurethane C-section part 12 having a 76.2 mm thick reinforcing coaxial lip annular lip 13 at either end and at least one "window" aperture 15. The window may be omitted, depending on requirements. However, it is found that the reduced area of the flanks of the tube as a result of the aperture(s) assist in reducing the effect of wave motion as the tube enters the water in the ship's wake and is particularly useful in rough seas. The C-section part 12 is secured to a closing part 14 completing the sleeve. The C-section part 12 and the closing part 14 are formed with two sets of aligning eyelets 16 through each of which a locating polyurethane pin 18 extends to hold the two together. Each pin is formed with an annular lip 19 toward one end which engages with a complementary recess 21 in the outer eyelets 16. The pins maybe inserted from either end through their respective sets of eyelets.

The sets of eyelets 16 are disposed symmetrically on either side of a notional line passing through the axis of the sleeve 10.

Each edge of the C-section part 12 at the junction with the closing portion 14 is formed to define a radially inwardly extending channel 20. The channel 20 cooperates with a complimentarily formed radially outwardly extending channel 22 defined by the closing part 14. Together the pair of channels define a small conduit in the wall of the sleeve when the two parts 12 and 14 are assembled. Alternatively, the C-section part and closing part define the radially outwardly and inwardly extending channels respectively.

Integrally formed in the closing part 14 is a locking hook arrangement 24 by which the assembly can be suspended from a towing wire. The arrangement comprises two sets of oppositely formed hooks 25, 26 which together define an aperture for the towing wire, which aperture extends parallel to the axis of the sleeve. The notional line, referred to above, passes through the center of the closing part 14 and that of the aperture in the locking hook arrangement 24. The hooks 25, 26 are intended to be a close fit on the wire to prevent the assembly slipping. The hook arrangement is significantly longer than the sleeve in order for it to double as a spacer between adjacent guide tubes. In this embodiment, the spacer constituted by the hook arrangement is 1 meter long. In FIG. 2 the hook arrangement is shown fragmented for convenience. The C-section part 12 can be attached to any other line of such spaces hooked on to a towing wire to provide an enclosed guide tube at predetermined intervals along the wire.

By having two pins to hold the assembly together, the assembly can be opened from either side simply by removing the appropriate pin to allow the C-section part 12 to swing open about a hinge constituted by the remaining pin 16. These pins do away with the known metal fasteners closing the sleeve which are prone to failure.

By providing additional auxiliary guide tubes in addition to the main guide tube defined by the C-section part and the cover the present invention also allows a variety of control and command lines to be deployed along with the cable.

The C-section part is made from rigid polyurethane material while the spacer/hook arrangement is made from a more resilient polyurethane. However, the two parts can be manufactured of any desired material as appropriate to suit a particular requirement. The overall buoyancy of the polyurethane used in this embodiment is about 1.2. Thus, the tension induced at the plough end of the cable is significantly reduced.

The guide tubes are designed so that they can be used to replace existing conventional guide tubes as need be.

It can be appreciated that the shape and size of the assembly does not lend itself to efficient storage. By dismantling the assembly it can be stored much more efficiently than the conventional complete guide tubes.

I claim:

1. A guide tube assembly for attachment to a cable towing line during deployment of an undersea cable passing through the guide tube assembly, said assembly comprising:
    an axially extended sleeve portion for guiding a cable therethrough, and
    a line securing portion, attached to the sleeve portion, and adapted to secure the sleeve to a towing line,
    the sleeve portion including an axially extended C-section part and a closing part which is detachably secured to the C-section part towards the free ends thereof to complete the sleeve.

2. An assembly as in claim in which the line securing portion extends axially beyond the axially-extended sleeve portion and is attached to the closing part of the sleeve portion.

3. An assembly as in claim 1 in which the securing portion is integrally formed with an adjacent part of the closing part.

4. An assembly as in claim 1 in which the assembly is symmetrical to either side of the securing means.

5. An assembly as in claim 1, in which the sleeve portion is formed with at least one auxiliary guide tube.

6. An assembly as in claim 5 in which the auxiliary tube is formed in a wall of the sleeve portion.

7. An assembly as in claim 6 in which the auxiliary guide tube include complementary formations in the C-section and the closing part.

8. An assembly as in claim 1 in which the closing part is secured to the C-section part by at least one locating pin extending through aligned holes in the parts.

9. An assembly as in claim 8 in which the closing part is secured to the C-section by two pins, each part being relatively swingable about each pin when the other is removed.

10. An assembly as in claim 1 in which the C-section part is formed with at least on window side wall aperture along its axially extended length.

11. A guide tube assembly for deployment of cable, said assembly having:
    (i) a guiding sleeve portion of C-shaped section,
    (ii) a securing portion which is releasably securable to a line by means of oppositely formed hooks, said securing portion having a closing part;
    (iii) the closing part being releasably securable to the guiding sleeve portion
so that the closing part substantially closes the C-shaped section of the guiding sleeve to complete the sleeve.

12. A guide tube assembly according to claim 11 in which the closing part is releasably secured to the guiding sleeve by two pines.

13. A guide tube assembly according to claim 12 in which either of the pins may be removed to allow the guiding sleeve to rotate about an axial formed by the remaining pin.

14. A guide tube assembly according to claim 13 in which the releasable pins are made from plastics material.

15. A guide tube assembly for deployment of cable, said assembly having:
    (i) a guiding sleeve portion of C-shaped section and formed with at least one auxiliary guide tube,
    (ii) a securing portion which is releasably securable to a line by means of oppositely formed hooks, said securing portion having a closing part;
    (iii) the closing part being releasably securable to the guiding sleeve portion
so that the closing part substantially closes the C-shaped section of the guiding sleeve to complete the sleeve.

16. A guide tube assembly according to claim 15 in which the guide tube assembly is symmetrical about a longitudinal axis passing through the center of the guiding sleeve.

17. A guide tube assembly according to claim 15 in which auxiliary guide tubes are formed from complementary formations in the guiding sleeve and the closing part.

18. A guide tube assembly according to claim 15 in which the guiding sleeve is made from plastics material.

19. A guide tube assembly according to claim 15 in which the guiding sleeve portion of C-shaped section has an inner radius of at least 400 mm, and a length of approximately 300 mm.

20. A guide tube assembly according to claim 11, 14 or 19 in which the guiding sleeve has a least one window aperture.

21. A guide tube assembly according to claim 19 which is made from a polyurethane material and has an overall buoyancy of about 1.2.

22. A method of laying submarine cable or conduit comprising:
   (i) releasing from a laying vessel a ploughing or trenching means to be towed by a towing line,
   (ii) securing to the towing line a securing portion of a guide tube assembly,
   (iii) connecting a guide sleeve to the securing portion by means of a removable pin,
   (iv) locating the cable or conduit to be guided in the guiding sleeve,
   (v) closing the guiding sleeve and securing the closure by inserting a second removable pin into aligned holes int eh respective parts, and
   (vi) passing the cable to be laid through the guide tube assembly.

* * * * *